Nov. 2, 1965 F. B. RYAN 3,215,404
CABLE OPERATED DOWN PRESSURE ASSEMBLY FOR
DITCHING AND CABLE LAYING TRAILERS
Filed Feb. 18, 1963 2 Sheets-Sheet 1
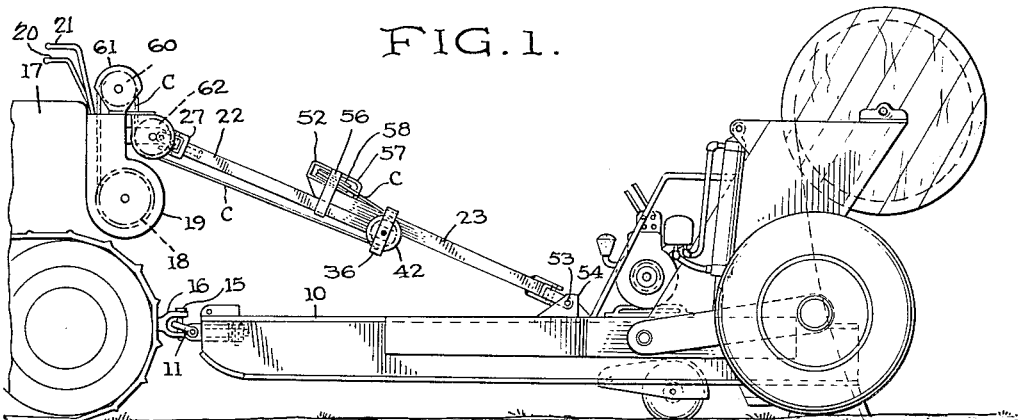
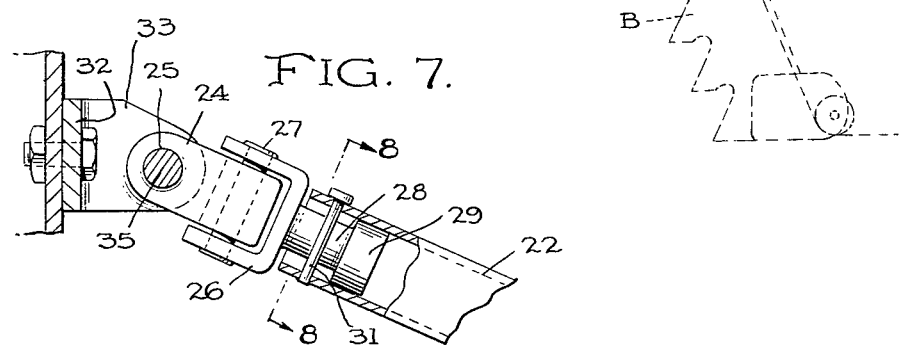
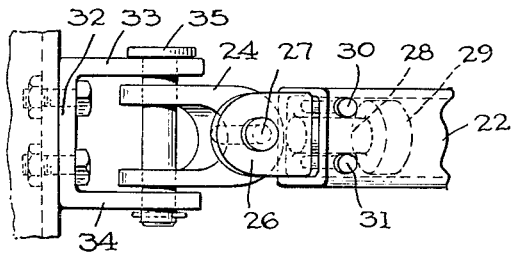 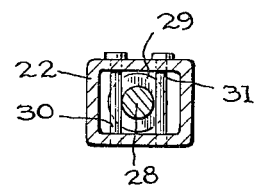
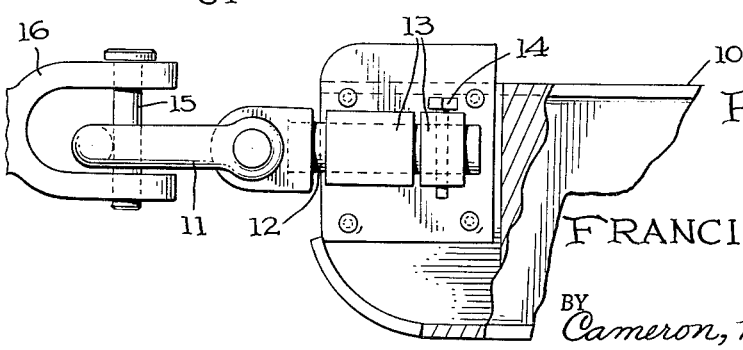
INVENTOR
FRANCIS B. RYAN
BY Cameron, Kerkam & Sutton
ATTORNEYS

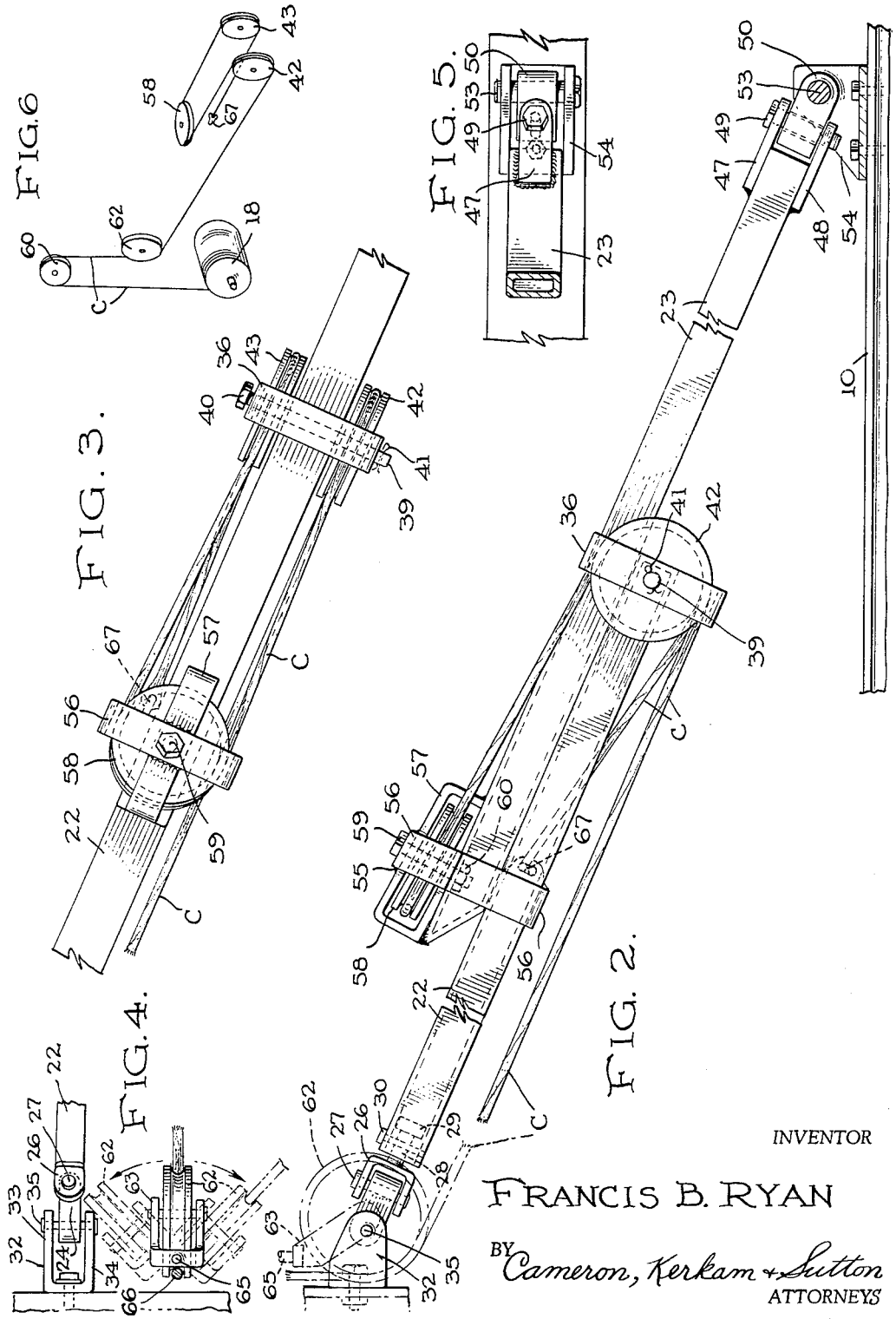

United States Patent Office 3,215,404
Patented Nov. 2, 1965

3,215,404
CABLE OPERATED DOWN PRESSURE ASSEMBLY FOR DITCHING AND CABLE LAYING TRAILERS
Francis B. Ryan, Chariton, Iowa
Filed Feb. 18, 1963, Ser. No. 259,201
7 Claims. (Cl. 254—188)

This invention relates to a cable actuated down pressure assembly designed to be mounted between the rear of a tractor and the tongue of a ditching or cable laying trailer pulled thereby to apply downward pressure to the tongue of the ditching and cable laying trailer, when required, to hold the ditching and cable laying blade in the ground.

Frequently, when a tractor is pulling a ditching and cable laying trailer over hard or frozen ground, the ditching and/or cable laying blade has a tendency to "ride up" out of the ground, despite the weight of the trailer structure. It thus becomes necessary to provide means between the rear extremity of the tractor and the trailer tongue to "hold down" the ditching and cable laying blade in the ground to maintain it in the proper position in the ground.

To this end, therefore, the present invention contemplates the provision of a telescoping and extensible beam structure affixed at its forward extremity to the rear of the tractor and at its lower or rearward extremity to the main center beam of the ditching or cable laying trailer, the inner extremities of each of said beams being provided with rectangularly opposed pulley beams through which is passed a heavy cable actuated from the cable drum disposed at the rear extremity to the tractor, the taking up of the cable on the cable drum tending to extend the two beams, sliding upon each other, and exerting downward pressure on the tongue of the trailer.

The present structure is particularly well adapted to the conventional tractor-trailer combination as most heavy tractors are provided with powered cable drums driven through a take-off shaft and gearing from the tractor motor.

The invention contemplates the provision of shear pins in the swivel pintle at the upper extremity of the extensible beam structure which may shear when an unusual force is exerted against the ditching blade, to prevent damage to the structure.

The invention further contemplates a hold-down structure for the trailer in which the hold-down pressure or thrust may be varied as required by the nature of the terrain behind ditched, and in which the hold-down assembly may be "locked" at a desired hold-down pressure.

The invention also contemplates a hold-down structure which is capable of free angular or vertical movement, depending upon the relative positions and attitudes of the tractor and trailer.

It also contemplates such a system in which all "down pressure" may be instantly released.

It is therefore a primary object of this invention to provide a tractor and a ditching and cable laying trailer drawn thereby extensible beam means which may be extended by a cable from the drum mounted at the rear extremity of the tractor, the said extensible beam means being designed to exert the required downward pressure against the tongue of the trailer as will hold the ditching and cable laying blade in the ground, regardless of the nature of the terrain.

Another object of this invention is to provide such an extensible hold-down structure which may readily be mounted between a conventional tractor and a ditching and cable laying trailer drawn thereby.

A further object of this invention is to provide such a hold-down structure between tractor and ditching trailer wherein the amount of downward thrust may be regulated as desired, depending upon the nature of the terrain.

Another object of the invention is to provide appropiate shear pins at the extremity of the hold-down structure to protect the hold-down structure and the trailer if the ditching blade strikes an obstruction.

It is a further object to provide such a structure which may be "locked" at a desired pressure and in which the down pressure may be instantly relieved or increased.

Other and further objects of this invention will become apparent as this specification proceeds.

Referring to the drawings, FIG. 1 is a side view, partially broken away and in phantom, of the novel hold-down structure in position between a tractor and a ditching and cable laying trailer drawn thereby;

FIG. 2 is an enlarged, detailed side view, partially in phantom and in section, of the hold-down structure, showing the pivotal and swivelling connections for the extremities of the beams and the pulley and cable assemblies therefor;

FIG. 3 is an enlarged detailed fragmentary top view of the pulleys, the housings therefor and the cable for actuating the hold-down structure;

FIG. 4 is a fragmentary detailed top view of the swivel and clevis connector at the upper rear frame of the tractor for affixing the upper extremity of the upper beam thereto, also showing the pivoted cable pulley positioned thereadjacent;

FIG. 5 is a fragmentary detailed top view of the pivoted connection for the lower extremity of the lower beam structure, also showing the bracket for affixing it to the rear extremity of the trailer tongue;

FIG. 6 is a schematic view of the control cable and pulley system for the hold-down beams, showing the manner in which the cable is passed from the cable drum over and about the various pulleys of the assembly;

FIG. 7 is an enlarged, detailed side view, partially broken away and in section, of the pivoted and swivelling connection and clevis for the upper extremity of the forward beam of the hold-down structure;

FIG. 8 is a cross-sectional view, taken on line 8—8 of FIG. 7, showing the paired shear pins bearing against the cylindrical tongue and shoulder of the pintle section thereof;

FIG. 9 is an enlarged, detailed top view, partially in phantom, of the swivelling pintle structure shown in FIG. 7; and FIG. 10 is an enlarged, detailed side view, partially broken away and in phantom, of the pintle and connector at the forward extremity of the trailer tongue.

In the drawings, 10 designates the tongue of the ditching and cable layer trailer which is of the type shown in my Patents Nos. 2,647,758, and 2,943,583 and comprises broadly a two-wheeled trailer with elongate tongue which supports at its upper, rear extremity a cable reel and from the lower extremity of which depends a cable laying and ditching blade B, as shown in my prior Patents Nos. 2,-632,265 and 2,649,747. Tongue 10 of the ditching and cable laying trailer is of considerable length and is preferably formed of two vertically disposed channel beams which are bolted together and which comprise the main center frame for the ditching and cable laying trailer.

Trailer hitch 11 is pivotally mounted between the forward extremities of tongue 10 by means of shank 12 and housing 13 wherein it is held by shear pin or bolt 14. Hitch 11 is U-shaped and registers with main bolt 15 of tractor pintle 16, both of conventional construction.

Tractor 17 is of conventional construction and is preferably of the heavy-duty, endless track type. At its median rear extremity tractor 17 is provided with cable drum 18, of conventional construction and provided as standard equipment on most heavy-duty tractors of this type. Cable drum 18 is enclosed in a housing 19 and is driven through an appropriate gear train by a take-off power shaft from the tractor motor, all of which structure is conventional. The cable drum is preferably controlled by brake and clutch levers 20 and 21, brake lever 20 controlling the brake band for the drum brake and acting to lock the drum against rotation and clutch lever 21 actuating the clutch therefor, as will hereinafter be dicussed in more detail.

The cable drum 18 is provided with a considerable length of heavy steel wire cable C which is appropriately wound thereupon and which is taken up upon the cable drum when the clutch lever is thrown to gear in the drum to the power source therefor.

As aforesaid, the cable drum structure and controls therefore are conventional and are supplied as standard equipment on most heavy duty tractors of this type.

The structure which has been described so far is basic and conventional. The description thereof was included more fully to explain the functioning of the novel hold-down structure between the rear of the tractor and the tongue of the ditching and cable laying trailer structure.

Referring specifically to the hold-down structure per se, it broadly comprises two preferably rectangular beam members 22 and 23 which are so mounted in relation to each other at their inner extremities as to be slidable upon each other and thus are capable of being extended in length as a unit with respect to each other, as will hereinafter be discussed in detail.

Referring specifically to upper beam 22, as aforesaid, it is preferably rectangular in cross-section and formed of steel or other appropriate light-weight metal of high tensile and torsional strength. At its upper or forward extremity beam 22 is provided with a rotatably mounted swivel pintle 24, shown in detail in FIGS. 7, 8 and 9. Pintle 24 is preferably U-shaped, as shown, and is bored at its forward extremities at 25. It is pivotally mounted in housing 26 by means of bolt 27. Housing 26 is provided with a cylindrical shank 28 which carries a cylindrical collar 29 at its extremity. Shear pins 30 and 31 are mounted through aligned bores in beam 22 and closely fit against shank 28 of pintle housing 26, above collar 29. Shank 28 is thus capable of rotation between shear pins 30 and 31.

Pintle clevis 32 is shown bolted or otherwise appropriately affixed to the upper, rear surface of the tractor frame and is provided with parallel arms 33 and 34 which are appropriately bored adjacent their extremities to receive bolt 35 which is also passed through bores 25 of pintle 24, pivotally retaining pintle 24 therein. It will thus be seen that at its forward extremity upper beam 22 of the down pressure assembly is pivotally and rotatably mounted in clevis 32 for free angular and swivelling movement with respect thereto.

At its lower extremity, beam 22 is provided with pulley housing 36 which is preferably in the form of an elongate rectangle bored through its lateral centers to receive pulley bolt 39 which is passed therethrough and through a registering bore 40 laterally disposed through the extremity of beam 22. As shown, bolt or axle 39 is provided with a head 40 at one extremity and is bored at the other extremity to receive cotter pin 41 to maintain it in position through bores 37 and 38 in pulley housing 36 and bore 40 in the extremity of beam 22.

Cable pulleys 42 and 43 are rotatably mounted on bolt 39 at each side of beam 22 within pulley housing 36. As shown, pulleys 42 and 43 are of a diameter approximately three times the width of beam 22 and are deeply slotted or grooved about their outer peripheries to receive cable C from cable drum 18, as will hereinafter be discussed at more length. Pulleys 42 and 43 make a slight clearance with the interior walls of housing 36 so as to be freely rotatable therein on bolt 39.

Appropriate sleeve bearings, not shown, are preferably provided within the internal bores of pulleys 42 and 43 to provide a free bearing surface for pulleys 42 and 43 on bolt 39. At their inner surfaces, pulleys 42 and 43 have a slight clearance with the lateral surfaces of beams 22 and 23 and at their outer peripheries they clear the inner surfaces of pulley housing 36 whereby pulleys 42 and 43 are freely rotatable within housing 36 in close bearing relationship with the lateral surfaces of upper beam 22 and lower beam 23. It will be further noted that the upper, inner rectilinear surface of pulley housing 36 registers closely with the upper, rectilinear surface of lower beam 23 in such fashion as to provide a retainer and bearing therefor. Thus, pulley housing 36 acts not only as a housing and cable guide for pulleys 42 and 43 but it acts as a retaining bearing holding the extremities of beams 22 and 23 in close, sliding engagement with each other at their upper and lower surfaces, respectively.

Referring now to lower beam 23, it will be seen that at its lower extremity beam 23 is provided with parallel arms 47 and 48 bored at their extremities to receive bolt 49. Tongue 50 fits closely between the outer extremities of arms 47 and 48 and is bored vertically at 51 to receive bolt 49. At its outer extremity tongue 50 is bore laterally at 52 to receive retaining bolt 53 which is laterally disposed through the walls of channel-shaped anchoring bracket 54 which is appropriately bolted or otherwise affixed to the rear, upper surface of tongue 10 of the trailer unit. It will thus be seen that the lower extremity of beam 23 can pivot laterally on bolt 49 and vertically on bolt 53.

At its upper extremity, beam 23 is provided with rectangular pulley housing 55, which is welded or otherwise affixed thereover. Pulley housing 55 is preferably cross-shaped and is composed of lateral housing member 56 and longitudinal housing member 57, longitudinal housing member 57 being disposed at 90° under lateral housing member 56. At its lower extremity, T-shaped lateral housing 56 is a reduced rectangle of such dimensions as to closely and slidably engage the lateral and lower surfaces of beam 22. Housing 55 is enlarged at its upper, cross-shaped extremity 56–57 to provide a close-fitting housing for cable pulley 58 which is rotatably mounted therewithin by means of retention bolt 59 which is passed downwardly through appropriate bores in housing members 56–57 and is affixed as by nut 60 in the upper surface of the extremity of beam 23. At its lower extremities longitudinal housing member 57 is welded or otherwise affixed to the upper surface of beam 23. It will thus be seen that pulley 58 is freely rotatable within upper housings 56–57 on bolt 59. As aforesaid, the lower, reduced rectangular section of housing member 56 closely and slidably engages the lateral surfaces and lower wall of beam 22 and thus acts as a retaining bracket to hold the lower surface of the upper extremity of beam 23 in close and sliding engagement to the upper surface of the lower extremity of beam 22. Thus, by virtue of the engagement of pulley housings 36 and 56, respectively, over beams 23 and 22 beams 23 and 22 are slidably bound together, and their extremities may be pulled toward each other by taking up on cable C, as will hereinafter be discussed at more length.

Referring now to cable C, extending from cable drum 18 within cable drum housing 19, it will be seen that cable C is preferably first passed upwardly from drum 18 over idler pulley 60 which is vertically mounted in housing 61 above cable drum housing 19. Housing 61 is appropriately bolted or otherwise affixed to the upper surface of drum housing 19 and is open at its lower extremities for free passage of cable C.

Cable C passes over idler pulley 60 and thence is brought downwardly about pivotally mounted idler pulley 62, as shown in FIG. 1. A detail of idler pulley 62 is shown in FIG. 4. Idler pulley 62, is, as shown, preferably mounted on the upper, rear surface of cable drum housing 19 adjacent to and laterally of upper beam clevis 32. As shown, pulley 62 is vertically mounted in offset housing 63 on pin 64. Housing 63 is preferably provided at its rear extremity with an elongate pin socket 65 fitting down over housing pin 64 whereby housing 63 is pivotally mounted for free lateral, angular movement on housing pin 64. Housing pin 64 is vertically affixed to housing pin stud 66 which is welded or otherwise affixed to the upper, rear surface of drum housing 19. By virtue of this offset, pivotal mounting, housing 63 and pulley 62 are free to swing alterally through an angle of about 90°, following the angular disposition of beam 22, as will hereinafter be more fully discussed. As shown in FIG. 1, pulley 62 and housing 63 are disposed laterally of upper beam clevis 32 and are aligned therewith.

Cable C is then passed rearwardly from pulley 62, parallel to upper beam 22, into pulley housing 36, under and back over pulley 42, closely fitting the groove about the outer periphery of pulley 42 and then is passed upwardly into pulley housing 55 and about pulley 58 whence it is brought downwardly at the opposite side of beams 22 and 23 and is passed within pulley housing 36 and about the periphery of opposed pulley 43. The extremity of cable C is then brought back upwardly and is clinched or otherwise appropriately affixed in cable anchor bracket 67 which is positioned at the outer, lower extremity of pulley housing 56, as shown in FIG. 3.

It will thus be seen that, by virtue of the novel pulley and cable connections between the inner extremities of beams 22 and 23, counterclockwise rotation of cable drum 18 will take up on cable C, drawing the inner extremities of beams 22 and 23 toward each other, through pulley 42, 58 and 43. This pulling of the inner extremities of beams 22 and 23 toward each other acts to extend the beam system an equal distance, resulting in the exertion of a strong downward thrust against the rear end of the trailer tongue. The "pulling" force exerted by cable drum 18 is multiplied by the number of reaches of cable in the pulley system, between drum 18 and cable anchor bracket 67. It will thus be seen that a very powerful downward thrust is exerted through the beam, pulley and cable system against the trailer tongue.

Thus, a comparatively moderate pull exerted upon cable C by cable drum 18 is translated into a very powerful downward thrust against the rear portion of trailer tongue 10 by virtue of the mechanical advantage resulting from the novel beam, pulley and cable assembly.

Normally, when the tractor is pulling the ditching and cable laying trailer over average or even fairly heavily compacted ground, the weight of the trailer structure, which normally exceeds 10,000 pounds, is more than sufficient to maintain the ditching and cable laying blade properly set at the desired depth in the ground, to ditch to the required depth. However, when the ground is frozen or is excessively compacted or hardened it is necessary to employ additional downward force to maintain the ditching blade at the proper depth in the surface of the ground and to prevent it from "pulling out" or from varying its depth of penetration. It is in these circumstances that the novel hold-down structure of the present invention must be called into play to insure a proper ditching operation. Thus, normally in winter, in areas where the ground is heavily frozen, this novel hold-down structure is essential to insure an efficient and uniform ditching operation.

Obviously, the harder the ground the greater the force which must be exerted through the cable C to insure the appropriate amount of extensible force exerted against the extremities of beams 22 and 23 to produce sufficient hold-down force at the rear extremity of tongue 10 of the trailer to maintain the ditching blade at proper setting and level under the surface of the terrain.

It will also be noted that where the surface of the terrain is uneven and hilly when the tractor arrives at a sudden elevation or rise in the terrain the slidable beam structure 22–23 is capable of "collapsing," beams 22 and 23 sliding freely upon each other to compensate for the angularity between tractor and trailer. The same compensatory effect occurs when the trailer drops over a sudden rise or irregularity in the terrain.

Further, due to the provision of the shear pins at the upper extremity of beam 22, if the main shear pin in the trailer pintle should shear, due to an obstruction or unusual strain, the shear pins in upper beam 22 will also shear, freeing the hold-down structure and preventing damage to the assembly.

The beams as shown in the present embodiment of the invention are preferably rectangular in cross section, but they may be of circular or even mating cross section, as desired.

Where it is desired to exert even more down pressure than that made possible with the five pass cable embodiment shown, additional pulleys may be added to further multiply the mechanical advantage of the pulley-cable connection between the extremities of the beam members of the hold-down structure.

Where it is desired to relieve tension on cable C, it is merely necessary to disengage the cable drum 18 from the drive mechanism therefor by means of the clutch lever, thus removing tension from cable C and deactivating the hold-down beam structure.

If the desired tension in cable C has been attained, then it is merely necessary to apply the cable drum brake through the brake lever to maintain the desired constant tension on cable C.

If the ditching blade should start to "pull out" of the ground during the ditching operation, additional downward thrust, as required, may be applied to the trailer tongue by gearing in the cable drum and taking-up additional cable on the cable drum until the force exerted by the beam system is sufficient to hold the blade at the required depth in the ground.

The cable from drum 18 may be taken directly from drum 18 to pulley 42, cutting auxiliary pulleys 60 and 62 out of the assembly, if desired.

Throughout the assembly, mechanical equivalents may be substituted for all elements of the combination without departing from the spirit of this invention.

This specification is by way of description of one preferred embodiment of the invention only. Attention is directed to the appended claims for a limitation of the scope of this invention.

What is claimed is:

1. In a hold-down structure for ditching trailers of the tractor-drawn type in which the tractor is provided with a powered cable drum, a tongue extending from the trailer attached at its forward extremity to the tractor and upper beam pivotally affixed at its upper extremity to the tractor frame, two vertically disposed pulleys rotatably mounted on opposite sides of the lower extremity of said upper beam, a lower beam pivotally affixed to the trailer tongue at its lower extremity and slidably engaging said upper beam at its inner extremity, a pulley mounted at the inner extremity of said lower beam disposed in a plane at 90° to the planes of the pulleys at the lower extremity of said upper beam, means holding the inner extremities of said beams in sliding engagement with each other, a cable extending from the cable drum of the tractor about said pulleys and affixed at its end adjacent said pulley at the upper extremity of said lower beam whereby when said cable is taken up on the cable drum the inner extremities of said beams will be drawn toward each other, extending said beam structure and exterting a downward thrust against the tongue of said trailer.

2. A hold-down structure as recited in claim 1 in which the pulleys at the lower extremity of the upper beam are provided with a rectangular, upwardly extended housing which fits over and slidably engages the inner extremity of said lower beam and the pulley at the inner extremity of said lower beam is provided with a rectangular, downwardly extended housing which fits over and slidably engages the lower extremity of said upper beam.

3. A hold-down structure as in claim 1 in which the cable is carried upwardly over an idler pulley affixed to the upper portion of said tractor and then downwardly about a lower idler pulley pivotally affixed therebeneath before passing to the first of said rearward pulleys.

4. In a hold-down structure for ditching trailers of the tractor-drawn type in which the tractor is provided at its rear extremity with a powered cable drum, a tongue extending from said trailer coupled at its forward extremity to the tractor, an upper beam member pivotally affixed at its upper extremity to the upper, rear portion of the tractor frame, an axle laterally disposed through the lower extremity of said beam and extending outwardly therefrom, paired pulleys rotatably mounted at each side of the lower extremity of said beam on said axle, a rectangular pulley housing mounted on the extremities of said axle and extending over said pulleys, a lower beam section pivotally mounted at its lower extremity on the upper surface of the rear extremity of the tongue of the ditching trailer, slidably engaging the upper surface of said upper beam and held in close engagement therewith by said pulley housing, a single pulley rotatably mounted on the upper surface of the upper extremity of said lower beam disposed at 90° to said lower pulleys, a downwardly extended, rectangular housing mounted about said upper pulley and closely and slidably enclosing said upper beam at its lower extremity, cable means extended from the tractor cable drum passing about one of said paired lower pulleys, brought back about said upper pulley and thence passed downwardly over the other of said paired pulleys with its extremity brought back to a position below and adjacent to said upper pulley where is is affixed at the outer surface of said housing covering said upper pulley whereby when said cable is taken up on the cable drum by counterclockwise rotation of the cable drum the ends of said beams are drawn toward each other extending said beam structure and exerting a downward thrust against the trailer tongue.

5. In a hold-down structure for ditching trailers of the type drawn by a tractor provided with a powered cable drum, a tongue extending from said trailer coupled at its forward extremity to the tractor, an upper beam member pivotally attached to the upper portion of the tractor at its upper extremity, a pulley housing mounted about the lower extremity of said upper beam, pulleys rotatably mounted in vertical position within said pulley housing at each side of the lower extremity of said upper beam, a lower beam pivotally mounted at its lower extremity on the tongue of said trailer and slidably engaging the upper surface of the lower extremity of said upper beam and slidably fitting within said pulley housing between said pulleys, a pulley housing mounted over the upper extremity of said lower beam reduced at its lower portion and slidably engaging about the lower extremity of said upper beam at its lower portion, an upper pulley rotatably mounted on the upper surface of the upper extremity of said lower beam within the upper portion of said upper pulley housing and disposed at 90° to the plane of said lower pulleys, a cable extending from the cable drum at the rear of said tractor passed rearwardly from said cable drum about one of said upper beam pulleys, brought back and about the pulley at the upper extremity of said lower beam and then back around the other of said upper beam pulleys and thence brought back and affixed to said upper pulley housing whereby force applied to said cable by winding it on said cable drum will draw the pulley-bearing, upper and lower extremities of said beams toward each other, extending said beam structure rearwardly and exerting a downward thrust against said trailer tongue.

6. A hold-down structure as recited in claim 5 wherein the cable is carried upwardly from the cable drum over a vertically mounted idler pulley affixed above the cable drum of the tractor and then is brought downwardly about a lower idler pulley before being passed rearwardly about one of said paired pulleys.

7. In a hold-down structure for ditching trailers of the tractor-drawn type in which the tractor is provided at its rear extremity with a powered cable drum, a tongue extending from the trailer and coupled at its forward extremity to the tractor, an upper beam member pivotally affixed at its upper extremity to the upper, rear portion of the tractor frame, an axle laterally disposed through the lower extremity of said beam and extending outwardly therefrom, paired pulleys rotatably mounted at each side of the lower extremity of said beam on said axle, a rectangular pulley housing mounted on the extremities of said axle and extending over said pulleys, a lower beam section pivotally mounted at its lower extremity on the upper surface of the rear extremity of the tongue of the ditching trailer and slidably engaging the upper surface of said upper beam and held in close engagement therewith by said pulley housing, a single pulley rotatably mounted on the upper surface of the upper extremity of said lower beam disposed at 90° to said lower pulleys, a downwardly extended, rectangular housing mounted about said upper pulley and closely and slidably enclosing said upper beam at its lower extremity, an idler pulley mounted on the upper rear extremity of the tractor, a second idler pulley mounted beneath said upper idler pulley adjacent the upper extremity of said upper beam, cable means extended from the tractor cable drum passing upwardly and over said upper idler pulley, then passing downwardly about said lower idler pulley, thence passing rearwardly about one of said paired lower pulleys, brought back about said upper pulley and thence passed downwardly over the other of said paired pulleys with its extremity brought back to a position below and adjacent to said upper pulley where it is affixed at the outer surface of said housing covering said upper pulley whereby taking up of said cable on the cable drum by counterclockwise rotation of the cable drum will draw the inner ends of said beams toward each other, extending said beams and exerting downward pressure against said trailer tongue.

References Cited by the Examiner

UNITED STATES PATENTS

| | | | |
|---|---|---|---|
| 2,642,293 | 6/53 | Simmons | 280—406 X |
| 2,931,446 | 4/60 | Gwenn | 172—464 |

FOREIGN PATENTS 272,491   4/14   Germany.

SAMUEL F. COLEMAN, *Primary Examiner.*

ANDRES H. NIELSEN, *Examiner.*

UNITED STATES PATENT OFFICE
CERTIFICATE OF CORRECTION

Patent No. 3,215,404

November 2, 1965

Francis B. Ryan

It is hereby certified that error appears in the above numbered patent requiring correction and that the said Letters Patent should read as corrected below.

Column 1, line 50, for "behind" read -- being --; line 59, after "provide" insert -- between --; column 2, lines 3 and 4, for "appropiate" read -- appropriate --; line 52, for "layer" read -- laying --; column 3, line 17, for "therefore" read -- therefor --; column 4, line 24, for "bore" read -- bored --; column 5, line 11, for "alterally" read -- laterally --; column 7, line 35, for "is", first occurrence, read -- it --.

Signed and sealed this 23rd day of August 1966.

(SEAL)
Attest:

ERNEST W. SWIDER
Attesting Officer

EDWARD J. BRENNER
Commissioner of Patents